Patented May 7, 1935

2,000,052

UNITED STATES PATENT OFFICE 2,000,052

PROCESS FOR THE MANUFACTURE OF COLORED COMPOUNDS AND THE PRODUCT THEREOF

Jocelyn Field Thorpe and Reginald Patrick Linstead, Earl's Road, Grangemouth, Scotland, assignors to Imperial Chemical Industries Limited, a corporation of Great Britain No Drawing. Application June 10, 1932, Serial No. 616,571. In Great Britain June 22, 1931

18 Claims. (Cl. 260—11)

This invention relates to colored compounds formed by treating phthalimide with a metal and the product thereof.

We have found that coloring matters of the above series can be obtained by using magnesium or antimony as metal and reacting with phthalimide or substituted phthalimides and ammonia. The use of magnesium is advantageous, both as regards the yield of the products obtained and the ease with which reaction takes place, while antimony has the advantage of giving a substantially metal-free product.

Instead of phthalimide, or substituted phthalimides, and ammonia, substances which are equivalent under the conditions of the reaction may be employed. Thus, phthalic anhydride and ammonia can be used as these yield phthalimide intermediately; phthalic acid diamide also may be employed, under suitable conditions. In general, however, we prefer to use phthalimide or substituted phthalimides, as these are convenient and generally cheaper. By a substituted phthalimide we mean one containing substituents in one or more of the 3-, 4-, 5- and 6-positions. Preferred substituted derivatives are chloro substituted ones such as 4-chloro, 3:4-dichloro- and 3:6-dichlorophthalimides, and nitrophthalimides, such as 4-nitrophthalimide. We do not include the use of o-cyano-benzamide or other o-cyano-arylamides as starting materials.

When magnesium is used the crude compounds contain magnesium, which in general appears to be in combined form. The crude magnesium compounds can be purified by suitable extraction with alkali, mineral acid and organic liquids, and then recrystallized from boiling quinoline, which is one of the few liquids in which they are sufficiently soluble. In recrystallizing the compound derivable from phthalimide itself a chocolate brown residue may remain undissolved in the quinoline. The formation of this residue is favored by increase of temperature and deficiency or absence of ammonia. Its solution in concentrated sulphuric acid has an intense crimson color, and when diluted precipitates what appears to be the original substance. The phthalimide compound gives blue needles from quinoline, these having a beautiful purple lustre, and dissolving in concentrated sulphuric acid without evolution of hydrogen, to a dull green solution, giving a greenish-blue precipitate on pouring on to ice. It is not appreciably soluble in alkaline hydrosulphite, while hot nitric acid destroys it. Its color is fast to light and very bright, especially when finally dispersed.

The greenish-blue precipitate obtained from the sulphuric acid solution of the phthalimide compound is found to be free from magnesium. It appears to be identical with the substantially metal-free compound which results if antimony is used instead of magnesium. The crude product using antimony can be purified in the same way as described for the crude product containing magnesium. The pure metal-free product obtained in this way or from the magnesium compound as described above has similar properties to the magnesium-containing one, it possesses the same stability and low solubility, is fast to light and bright in shade, and behaves similarly with alkaline hydrosulphite and nitric acid. Apart from quinoline and its derivatives, the only organic substances which dissolve it appreciably are benzophenone, naphthalene and alicyclic alcohols, such as cyclehexanol and menthol, which yield blue solutions, and aniline and its homologues which give green solutions, these green solutions apparently being the result of compound formation and no crystallization occurring from them.

We have also found that the metal-free compound can be reconverted to a magnesium-containing one by reacting with magnesium, for instance in boiling benzophenone in the presence of oxygen. This magnesium-containing compound appears to be identical with that formed by direct synthesis from magnesium, phthalimide and ammonia as already described.

The pure magnesium-containing compound appears to be either a single compound or a mixture of compounds of closely related structure, and the same applies to the metal-free compound. Further the metal-free and magnesium-containing compounds also appear to be of closely related structure. The structure is not known with certainty, and its determination is a matter of considerable difficulty as will be evident from the formulæ which follow. Typical analyses of the magnesium compound are as follows:—

| C | H | N | Mg |
|------|-----|------|-----|
| 67.8 | 3.7 | 19.5 | 4.5 |
| 67.3 | 3.4 | 19.4 | 4.4 |
| 67.7 | 3.7 | 18.3 |     |

The molecule appears to include as an essential unit an isoindole residue with an extracyclic nitrogen, this unit being repeated. Almost certainly there is a system of conjugated double bonds running through the molecule somewhat as follows:—

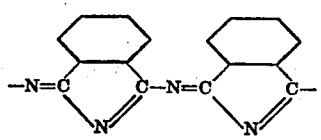

Heating a metal with a phthalimide, which may have groups substituted on the 3, 4, 5, and 6 positions, in the presence of ammonia probably results in the production of water and the aforementioned grouping. This grouping probably condenses in the presence of the metal and ammonia to form more complicated compounds, having one or more of the following structures. During the course of this reaction it is likely that some or all of the products should have metallic elements included in the molecule. This, of course, depends upon the metal used and the conditions under which the reaction is carried out.

The most likely structure for the magnesium-free compound appears to be one of the following:—

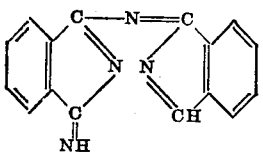

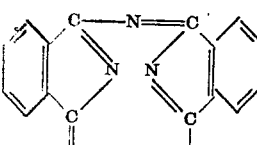

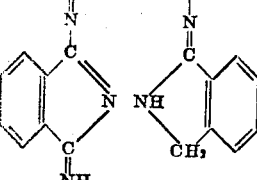

while for the magnesium-containing compounds the following are suggested:—

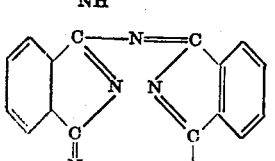

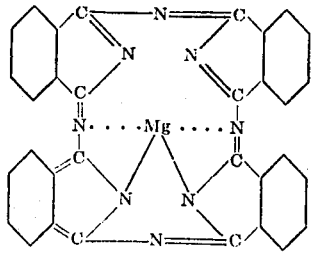

While the foregoing remarks as to properties and constitution apply primarily to the compounds from phthalimide itself, the properties of the compounds from substituted phthalimide are, subject to differences due to the presence of the substituents, similar, and their constitutions appear to be similar also.

The compounds can be employed in the art of coloring, particularly as pigments. They may, for instance, be made into lakes and the lakes incorporated in suitable varnishes and used as printing ink. The magnesium-free compound from phthalimide is very suitable for use in this way.

The invention includes the use of the compounds as coloring matters as well as their manufacture.

The following examples in which parts are by weight illustrate but do not limit the invention.

*Example 1*

150 parts of phthalimide and 25 parts of magnesium turnings are heated at 260–270° C. for 8 hours in a free stream of ammonia. The resulting product is then extracted with hot caustic soda and the residue boiled with hydrochloric acid (about 1 part of hydrochloric acid to 1 part of water). It can be further purified by extraction with aniline and quinoline.

*Example 2*

This is another example of the production of a product from phthalimide and magnesium.

94 parts of phthalimide and 4.7 parts fine magnesium powder, well mixed togeher, are heated in an enamelled vessel which is heated by immersion in an oil bath and ammonia gas passed through an inverted conical cover which serves the double purpose of distributing the ammonia gas to the whole upper surface of the charge and of condensing phthalic anhydride which sublimes. The temperature of the charge being adjusted to 240–245° C., heating is continued for 6–7 hours or longer if necessary while the ammonia is passed. The charge, fluid at first, gradually hardens. When a test shows that dye formation is substantially complete the charge is cooled, broken up and extracted with caustic soda solution to remove unchanged phthalimide and then with hydrochloric acid to remove metallic magnesium. The product is a greenish-blue pigment and is formed along with a small-percentage of a red impurity.

The magnesium-containing pigment can be obtained in excellent crystalline form and purity by recrystallizing from quinoline.

*Example 3*

This is another example of the production of the metal-containing compound from magnesium and phthalimide. The purification of the product is also described.

A mixture of 500 parts of phthalimide and 20 parts of finely divided magnesium are heated in a wide tube, and a stream of dry ammonia passed over, the internal temperature being maintained at 240–250° C., and the molten mass being mechanically stirred. After heating for several hours the viscous mass is allowed to cool, broken up and extracted with 5% caustic soda solution. The residue is further extracted with hydrochloric acid to remove metal, and then with boiling acetone and dried. It is further extracted with boiling quinoline when about 20% remains behind as a chocolate-brown impurity.

*Example 4*

100 parts of phthalimide and 5 parts of antimony powder are heated in a stream of ammonia at 250–270° C. for 5½ hours. The product is worked up in a similar manner to that of Example 1.

*Example 5*

9.1 parts of 4-chlorophthalimide (M. P. 202–204°), are heated with an excess of magnesium foil in a stream of ammonia at 250°. The product is purified in the usual way, and gives a bright greenish-blue substance with a purple reflex.

*Example 6*

This is similar to Example 3, but 3:4-dichlorophthalimide (M. P. 348–351°) is employed.

A green substance with a purple reflex is obtained, it dissolves in sulphuric acid with a Vandyke brown color and the product both before and after acid treatment is greener than the previously mentioned products.

*Example 7*

This is also similar to Example 3, but 4-nitrophthalimide is employed. Using a starting material of (M. P. 198) a dark-green powder having a purple reflex is obtained. This powder dissolves in sulphuric acid with a green color and yields a blue-green substance on dilution.

*Example 8*

This is another example similar to Example 3, but 3:6-dichlorophthalimide is employed. This gives a dark blue-green powder, giving a red solution in sulphuric acid. This, on dilution, yields a dark green substance drying almost black.

*Example 9*

This is an example of the conversion of the metal-free compound to its magnesium derivative.

380 parts of the metal-free compound and 15 parts of magnesium powder are heated in a large quantity of boiling benzophenone at about 307° for several hours under access of air.

The product is then purified to remove excess magnesium and benzophenone.

*Example 10*

This is an example of the application as pigment of the metal-free compound obtained by the treatment of magnesium with phthalimide and ammonia, followed by dissolving in concentrated sulphuric acid for removal of metal. The coloring matter is first made into a lake and the lake then used in the production of a colored varnish.

4 parts of aluminium sulphate (17 to 18% of $Al_2O_3$) are precipitated from a 10% solution of 50° C., with 2 parts of soda ash in the form of a 10% solution. 9 parts of the magnesium-free compound in the form of a 10% aqueous paste are then stirred in and lake formation completed with the gradual addition of 5 parts of barium chloride in the form of a 10% solution and also with continual stirring. Stirring is continued for several minutes and then the lake is filtered, washed and dried in the usual manner. The dried lake can then be ground to develop the shade. The lake is then made up into an ink by grinding with a Middle Litho varnish until thorough incorporation has taken place, and this ink can then be used in lithographic work.

Many variations and modifications are possible in our preferred procedure without departing from the spirit of this invention. It should be understood further that although we have advanced some theories as to the constitution of the final product for the purpose of explaining our invention more clearly, the latter is, in fact dependent on no particular theory.

As many apparently widely different embodiments of this invention may be made without departing from the spirit and scope thereof, it is to be understood that we do not limit ourselves to the specific embodiments thereof except as defined in the appended claims.

We claim:—

1. A process for the manufacture of colored compounds which comprises heating a phthalimide and a metal in the presence of ammonia.

2. A process for the manufacture of colored compounds which comprises heating phthalimide and magnesium in the presence of ammonia.

3. A process for the manufacture of colored compounds which comprises heating phthalimide and antimony in the presence of ammonia.

4. A process for the manufacture of a coloring compound, which comprises heating a phthalimide with magnesium in the presence of ammonia and extracting the product successively with alkali and mineral acid.

5. The product produced according to the process of claim 1.

6. The product produced according to the process of claim 2.

7. A process for the manufacture of colored compounds which comprises heating a phthalimide and magnesium in the presence of ammonia.

8. A process for the manufacture of colored compounds which comprises heating a phthalimide and antimony in the presence of ammonia.

9. A process for the manufacture of colored compounds which comprises heating a phthalimide selected from the group consisting of phthalimide, chlorinated phthalimide and nitrated phthalimide, in the presence of magnesium and ammonia.

10. A process for the manufacture of colored compounds which comprises heating a phthalimide selected from the group consisting of phthalimide, chlorinated phthalimide and nitrated phthalimide, in the presence of antimony and ammonia.

11. A process for the manufacture of colored compounds which comprises heating a phthalimide and a metal at a temperature sufficient to melt the phthalimide, and in contact with a stream of gaseous ammonia, cooling the reaction mass, and extracting the same successively with alkali and acid, to remove unchanged initial material.

12. A process for the manufacture of colored compounds which comprises heating a phthalimide and magnesium at a temperature sufficient to melt the phthalimide, and in contact with a stream of gaseous ammonia, cooling the reaction mass, and extracting the same successively with alkali and acid, to remove unchanged initial material.

13. A process for the manufacture of a colored compound which comprises heating a phthalimide and magnesium in contact with ammonia gas at a temperature sufficient to form initially a fluid melt, cooling the reaction mass, removing unconverted initial material, and recrystallizing the remaining mass from quinoline.

14. A process for the manufacture of a colored compound which comprises heating a phthalimide and magnesium in contact with ammonia gas at a temperature sufficient to form initially a fluid melt, cooling the reaction mass, removing unconverted initial material, and recrystallizing the reaction product from concentrated sulfuric acid, whereby to produce a metal-free product.

15. The product obtainable by a process including the steps set forth in claim 11.

16. A product obtainable by a process including the steps set forth in claim 12.

17. A product being substantially identical with the product obtainable according to the process defined in claim 13, said product being characterized by containing magnesium.

18. A product being substantially identical with the product obtainable according to the process defined in claim 14, said product being substantialy free from combined metal.

JOCELYN FIELD THORPE.
REGINALD PATRICK LINSTEAD.